United States Patent
Nagahama et al.

(10) Patent No.: US 11,685,444 B2
(45) Date of Patent: Jun. 27, 2023

(54) VEHICLE BODY LATERAL SECTION STRUCTURE

(71) Applicant: HONDA MOTOR CO., LTD., Tokyo (JP)

(72) Inventors: Taku Nagahama, Wako (JP); Kodai Baiju, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/638,201

(22) PCT Filed: Sep. 2, 2020

(86) PCT No.: PCT/JP2020/033162
§ 371 (c)(1),
(2) Date: Feb. 25, 2022

(87) PCT Pub. No.: WO2021/065301
PCT Pub. Date: Apr. 8, 2021

(65) Prior Publication Data
US 2022/0297759 A1    Sep. 22, 2022

(30) Foreign Application Priority Data

Oct. 4, 2019    (JP) .............................. JP2019-183600

(51) Int. Cl.
*B62D 25/04*    (2006.01)
*B62D 27/02*    (2006.01)
*B62D 25/02*    (2006.01)

(52) U.S. Cl.
CPC ........... *B62D 25/04* (2013.01); *B62D 25/025* (2013.01); *B62D 27/023* (2013.01)

(58) Field of Classification Search
CPC ......................... B62D 25/2036; B62D 27/023
(Continued)

(56) References Cited

U.S. PATENT DOCUMENTS

2018/0057066 A1    3/2018    Baccouche et al.

FOREIGN PATENT DOCUMENTS

| EP | 2420432 | 2/2012 |
| JP | 3104530 | 10/2000 |

(Continued)

OTHER PUBLICATIONS

International Search Report and Written Opinion for International Application No. PCT/JP2020/033162 dated Oct. 6, 2020 8 pages.

*Primary Examiner* — Dennis H Pedder
(74) *Attorney, Agent, or Firm* — Amin, Turocy & Watson, LLP

(57) ABSTRACT

A lateral section structure (10) of a vehicle body is equipped with a center pillar (14) which extends in a vertical direction and in which an outer panel (31) and an inner panel (32) are joined. An opening section (96) into which a seatbelt component (50) is inserted is formed in the inner panel. The outer panel has a lower section and an upper section. The lower section forms a lower portion of the outer panel. The upper section overlaps the lower section and extends upward. A lower end of the upper section is inclined upward or downward in a forward-rearward direction of a vehicle body along a lower end of an overlapping section in which the lower section and the upper section overlap and are joined to each other, and is disposed at a position at which the lower end of the upper section faces the opening section.

10 Claims, 8 Drawing Sheets

(58) Field of Classification Search
USPC ............................... 296/209, 193.06, 29, 30
See application file for complete search history.

(56) References Cited

FOREIGN PATENT DOCUMENTS

| | | |
|---|---|---|
| JP | 2008-254595 | 10/2008 |
| JP | 2009-184515 | 8/2009 |
| JP | 2010-173403 | 8/2010 |
| JP | 2012-040910 | 3/2012 |

VEHICLE BODY LATERAL SECTION STRUCTURE

TECHNICAL FIELD

The present invention relates to a lateral section structure of a vehicle body.

BACKGROUND ART

In a lateral section structure of a vehicle body, normally, a roof side rail extends in a forward-rearward direction of the vehicle body on the lateral side of an upper portion of the vehicle body, a side sill extends in the forward-rearward direction of the vehicle body on the lateral side of a lower portion of the vehicle body, and a center pillar is connected to the side sill and the roof side rail. The center pillar has, for example, a closed cross section that extends in a vertical direction with an outer panel and an inner panel. In this center pillar, an upper end portion of the outer panel is fixed to an outer surface of the roof side rail, and a lower end portion of the outer panel is fixed to an outer surface of the side sill. Further, an upper end portion of the inner panel is fixed to an inner surface of the roof side rail, and a lower end portion of the inner panel is fixed to an inner surface of the side sill.

Here, in the center pillar, it is known that a rear flange may be reinforced by a reinforcing member by joining the reinforcing member to the rear flange of the outer pillar. When a load is input to this center pillar due to, for example, a lateral collision, the rear flange and the reinforcing member can be gently bent by the input load. Therefore, the input load can be distributed by the rear flange and the reinforcing member. Thus, occurrence of cracks can be suppressed in the rear flange (refer to, for example, Patent Document 1 (Japanese Patent No. 3104530)).

Further, in the center pillar, it is known that a bracket for a seat belt retractor may be mounted on the inner panel, and a joint portion between an upper section and a lower section of a reinforcement be reinforced by a reinforcing member provided on the bracket. When a load is input to the center pillar due to a lateral collision, for example, the reinforcement member can suppress the occurrence of cracks in the joint portion between the upper section and the lower section of the reinforcement due to the input load (refer to, for example, Patent Document 2 (Japanese Unexamined Patent Application, First Publication No. 2008-254595)).

Furthermore, in the center pillar, it is known that an opening section may be provided in the lower portion of the inner panel, and a stress distribution linear section having a substantially linear shape and a small radius of curvature be formed at a corner portion, among corner portions of the opening section, at which stress concentration is likely to occur due to a load input by a lateral collision. The seat belt retractor is disposed in the opening section of the inner panel.

When a load is input to the center pillar due to, for example, a lateral collision, it is possible to suppress stress concentration on the stress distribution linear section due to the input load. Thus, it is possible to suppress the occurrence of cracks in the stress dispersion linear section (refer to, for example, Patent Document 3 (Japanese Unexamined Patent Application, First Publication No. 2009-184515)).

SUMMARY OF INVENTION

Technical Problem

Here, in the center pillar of Patent Document 1, it is necessary to reinforce the rear flange with a reinforcing member in order to suppress the occurrence of cracks in the rear flange of the outer pillar, and this hinders minimizing increase in weight.

Further, in the center pillar of Patent Document 2, it is necessary to reinforce the joint portion with a reinforcing member in order to suppress the occurrence of cracks in the joint portion between the upper section and the lower section of the reinforcement, and it hinders an increase in a weight.

Further, in the center pillar of Patent Document 3, it is necessary to form a stress distribution linear section in the opening section in order to suppress the occurrence of cracks in the opening section of the inner panel. Therefore, it is conceivable that the opening section may become too large, a bending strength of the inner panel may decrease, and an amount of absorption of impact energy may decrease.

An aspect of the present invention provides a lateral section structure of a vehicle body with which increase in weight is minimized and an amount of absorption of impact energy is ensured.

Solution to Problem (1) A lateral section structure of a vehicle according to the present invention is a lateral section structure of a vehicle body with a center pillar which extends in a vertical direction and in which an outer panel and an inner panel are joined, wherein an opening section into which a seatbelt component is inserted is formed in the inner panel, the outer panel has a lower section configured to form a lower portion of the outer panel, and an upper section configured to overlap the lower section and to extend upward, and a lower end of the upper section is inclined upward or downward in a forward-rearward direction of a vehicle body along a lower end of an overlapping section in which the lower section and the upper section overlap and are joined to each other, and is disposed at a position at which the lower end of the upper section faces the opening section.

According to the aspect of (1), the fragile section that is inclined upward or downward in the forward-rearward direction of the vehicle body can be easily formed along the lower end of the overlapping section in which the lower section and the upper section overlap and are joined to each other. Thus, when a load is input to the center pillar due to, for example, a lateral collision, the center pillar is bent and deformed along the fragile section by the input load. Here, the fragile section is inclined upward or downward in the forward-rearward direction of the vehicle body and is disposed at a position at which the fragile section faces the opening section. Therefore, a tensile load acts in the vertical direction on the peripheral edge of the opening section facing the fragile section along a virtual line that is inclined upward or downward in the forward-rearward direction of the vehicle body. Thus, impact energy is absorbed by deforming the peripheral edge of the opening section along the inclined virtual line, and then the peripheral edge of the opening section is cracked and broken along the virtual line.

A length of the crack (that is, a length of deformation) can be increased by inclining the crack at the periphery of the opening section, as compared to, for example, a case in which a horizontal crack is generated at the peripheral edge of the opening section. An amount of absorption of impact energy input by a lateral collision or the like can be increased by increasing the length of the crack. In this way, an increase in a weight of the center pillar can be suppressed and the amount of absorption of impact energy can be ensured by inclining the fragile section in the forward-rearward direction of the vehicle body.

(2) In the aspect of (1), the outer panel may be formed to have a hat-shaped cross section that opens inward in the vehicle width direction by a top section disposed in the forward-rearward direction of the vehicle body, a pair of leg sections configured to extend inward from both ends of the top section in a vehicle width direction, and a pair of brim sections configured to protrude from the pair of leg sections in the forward-rearward direction of the vehicle body, and a fragile section may be disposed along a lower end of the upper section on the top section.

According to the aspect of (2), when a load is input to the center pillar due to a lateral collision or the like, the load is input to the top section. The fragile section that is inclined in the forward-rearward direction of the vehicle body is disposed at the top section. Therefore, due to the load input to the top section, the tensile load acts in the vertical direction on the virtual line corresponding to the inclination of the fragile section from the leg section toward the brim section.

Here, the inner panel is joined to the brim section, and the opening section is formed in the inner panel. Thus, due to the tensile load acting on the brim section, cracks can be efficiently generated at the peripheral edge of the opening section along the inclined virtual line.

(3) In the aspect of (1) or (2), in the outer panel, the lower section may be joined to an outer surface of a side sill that extends in the forward-rearward direction of the vehicle body, and the inner panel may pass through the side sill and may be joined thereto.

According to the aspect of (3), the lower section of the outer panel is joined to the outer surface of the side sill, and the inner panel passes through the side sill and is jointed thereto. Therefore, the center pillar is firmly joined to the side sill. Thus, when a load is input to the center pillar due to a lateral collision or the like, due to the input load, a tensile load can be surely applied in the vertical direction along the virtual line corresponding to the fragile section, and the amount of absorption of impact energy can be ensured.

In addition, the side sill is a frame member in which a hollow structure is continuously formed in the forward-rearward direction of the vehicle body, and in particular, strength and rigidity are high against the load in the front and rear of the vehicle body. Thus, for example, the load input by a frontal collision or a rear collision can be supported by the side sill, and an influence on the center pillar can be suppressed.

(4) In the aspect of (3), in the side sill, a floor cross member that extends in the vehicle width direction may be joined to an inner surface inside the side sill in the vehicle width direction that faces an inside in the vehicle width direction.

According to the aspect of (4), the floor cross member is joined to the inner surface of the side sill. Therefore, the center pillar can be supported more firmly by the side sill against the load input to the center pillar due to a lateral collision or the like. Thus, due to the load input to the center pillar by the lateral collision or the like, the tensile load can be applied more reliably in the vertical direction along the virtual line corresponding to the fragile section, and the amount of absorption of impact energy can be ensured more preferably.

(5) In the aspect of any one of (1) to (4), in the center pillar, an upper end portion of the upper section may be joined to an outer surface of a roof side rail that extends in the forward-rearward direction of the vehicle body, and an upper end portion of the inner panel may be joined to an inner surface of the roof side rail.

According to the aspect of (5), the upper end portion of the upper section is joined to the outer surface of the roof side rail, and the upper end portion of the inner panel is joined to the inner surface of the roof side rail. Therefore, the upper end portion of the center pillar is firmly joined to the roof side rail. Thus, when a load is input to the center pillar due to a lateral collision or the like, the tensile load can be more reliably applied in the vertical direction along the virtual line corresponding to the fragile section due to the input load, and the amount of absorption of impact energy can be ensured more preferably.

(6) In the aspect of any one of (2) to (5), a rear end portion of a front door beam may be disposed to face a front end portion of the fragile section on an outside in the vehicle width direction, and a front end portion of a rear door beam may be disposed to face a rear end portion of the fragile section on an outside in the vehicle width direction.

According to the aspect of (6), the rear end portion of the front door beam faces the front end portion of the fragile section. In addition, the front end portion of the rear door beam faces the rear end portion of the fragile section. Therefore, when a load is input due to a lateral collision or the like, the input load can be transmitted from the front door beam and the rear door beam to the fragile section. That is, the fragile section can be deformed to be surely recessed inward in the vehicle width direction by the input load. Thus, the tensile load can be reliably applied in the vertical direction along the virtual line corresponding to the fragile section, and the amount of absorption of impact energy can be preferably ensured.

(7) In the aspect of any one of (2) to (6), the fragile section may be formed by a reinforcing member of the lower section provided at a predetermined interval downward from a lower end of the upper section.

According to the aspect of (7), the reinforcing member is provided at a predetermined interval downward from the lower end of the upper section, and the fragile section is formed by the reinforcing member. Thus, the fragile section can be easily formed in the lower section.

Further, for example, a hinge (a lower hinge) of a side door (a rear side door) of the center pillar behind the vehicle body can be firmly fixed to the center pillar using the reinforcing member.

(8) In the aspect of any one of (2) to (7), the fragile section may be formed by a bent section of a mounting pedestal, on which a door hinge is mounted, in the lower section.

According to the aspect of (8), the fragile section is formed using the bent section of the mounting pedestal on which the door hinge is mounted. Thus, the fragile section can be easily formed on the outer panel. In addition, the lower door hinge provided on the side door behind the vehicle body can be fixed to the center pillar. Further, for example, the hinge (the lower hinge) of the side door (the rear side door) of the center pillar behind the vehicle body can be firmly fixed to the mounting pedestal.

(9) In the aspect of any one of (1) to (8), the center pillar may include a first reinforcing member that overlaps the upper section, and a second reinforcing member that is formed to be smaller than the first reinforcing member in the vertical direction and overlaps the first reinforcing member, and the upper section, the first reinforcing member, and the second reinforcing member may overlap each other at a portion above a belt line.

According to the aspect of (9), at a portion above the belt line (a lower end of a window), the upper section, the first reinforcing member, and the second reinforcing member overlap each other. That is, the strength and rigidity of the portion above the belt line are increased. Therefore, a load input due to a lateral collision or the like is transmitted to the fragile section, and the fragile section can be deformed to be surely recessed inward in the vehicle width direction by the transmitted load. Thus, the tensile load can be reliably applied in the vertical direction along the virtual line corresponding to the fragile section, and the amount of absorption of impact energy can be preferably ensured.

(10) In the aspect of any one of (1) to (9), the first reinforcing member may be formed to have a U-shaped cross section along an inner surface of the outer panel, the second reinforcing member may be formed to have a U-shaped cross section along an inner surface of the first reinforcing member, and the center pillar may include a bulkhead that is provided on at least one of the first reinforcing member and the second reinforcing member and suppresses crushing and deforming in the vehicle width direction.

According to the aspect of (10), the bulkhead is provided in at least one of the first reinforcing member and the second reinforcing member, and crushing and deforming in the vehicle width direction is suppressed by the bulkhead. Therefore, the load input due to a lateral collision or the like is transmitted to the fragile section, and the fragile section can be deformed to be surely recessed inward in the vehicle width direction by the transmitted load. Thus, the tensile load can be reliably applied in the vertical direction along the virtual line corresponding to the fragile section, and the amount of absorption of impact energy can be preferably ensured.

Advantageous Effects of Invention

According to the aspect of the present invention, the fragile section is inclined in the forward-rearward direction of the vehicle body, and the fragile section is disposed at a position at which the fragile section faces the opening section. Thus, an increase in a weight can be suppressed, and the amount of absorption of impact energy can be ensured.

DESCRIPTION OF EMBODIMENTS

Figure 1:
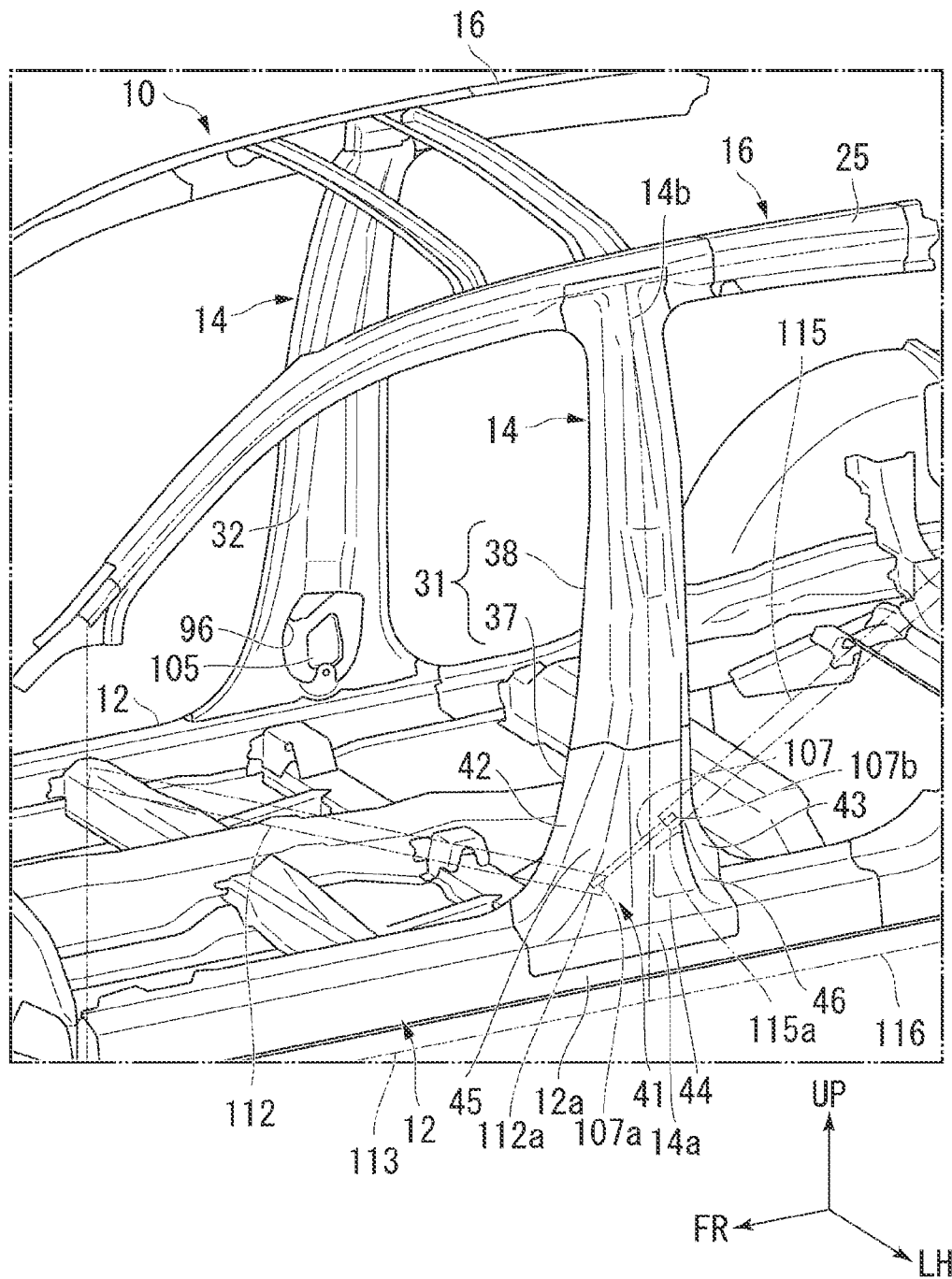
FIG. 1 is a perspective view showing a lateral section structure of a vehicle body according to an embodiment of the present invention.

Hereinafter, embodiments of the present invention will be described with reference to the drawings. In the drawings of the embodiment, an arrow FR indicates the front side of the vehicle 1, an arrow UP indicates the upper side of the vehicle 1, and an arrow LH indicates the left side of the vehicle 1.

A lateral section structure 10 of a vehicle body of an embodiment has a substantially bilaterally symmetrical constitution, the same reference numerals are given to left and right constituent members, and the constitution on the left side will be mainly described in detail.

<Lateral Section Structure of Vehicle Body>

As shown in FIG. 1, the lateral section structure 10 of the vehicle body includes a side sill 12, a center pillar 14, and a roof side rail 16.

The side sill 12 is formed to have a closed cross section that extends in a forward-rearward direction of the vehicle body on the lateral side of a lower portion of the vehicle body. The center pillar 14 extends upward from a central section 12a of the side sill 12 in the forward-rearward direction of the vehicle body. The roof side rail 16 is fixed to an upper end portion 38a of the center pillar 14 (specifically, an upper section 38 that will be described later). The roof side rail 16 is formed to have a closed cross section (refer to FIG. 2) that extends in the forward-rearward direction of the vehicle body on the lateral side of an upper portion of the vehicle body.

<Side Sill>

Figure 2:
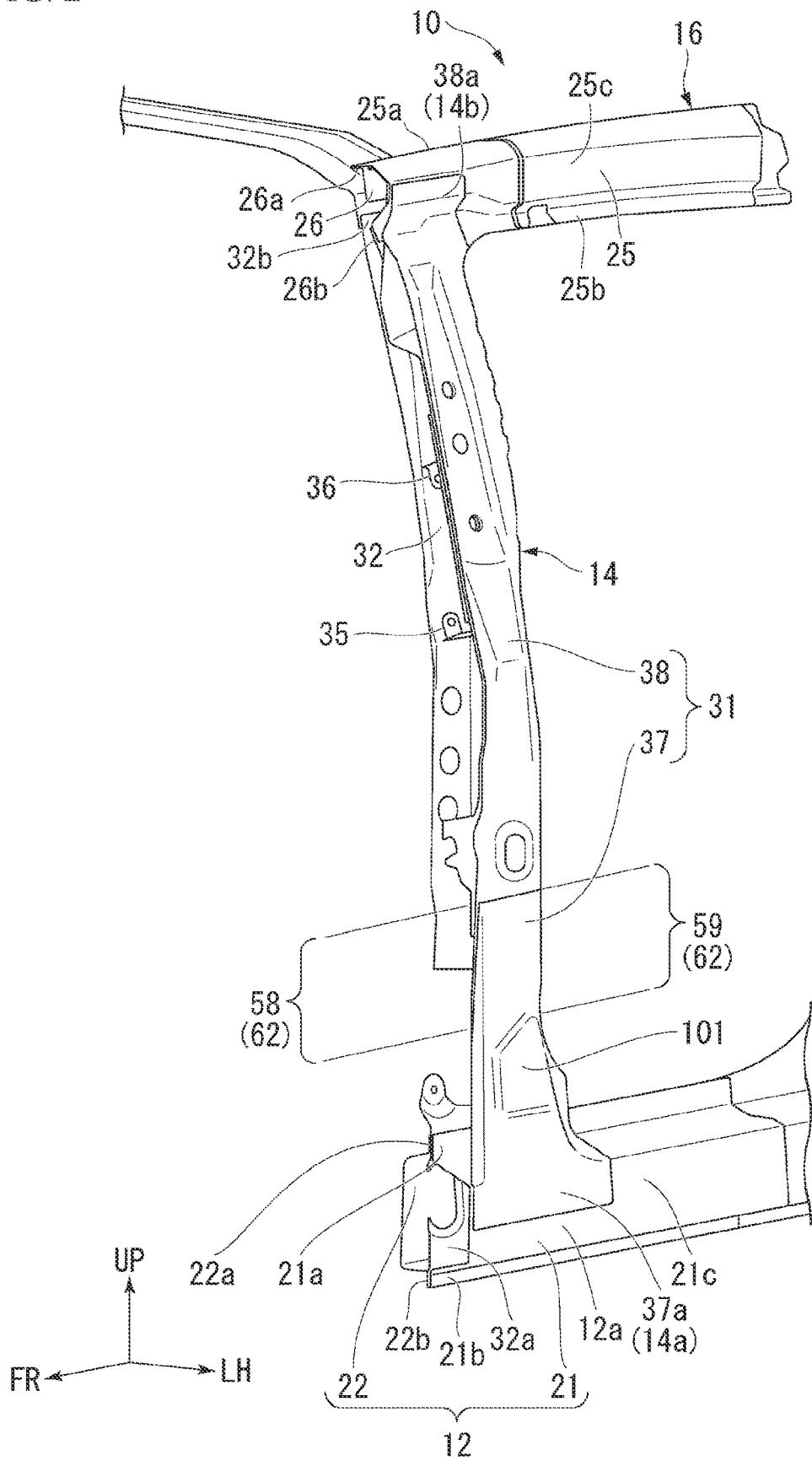
FIG. 2 is a perspective view of a state in which the lateral section structure of the vehicle body of the embodiment is broken by a center pillar when seen from the front side of the vehicle body.
Figure 3:
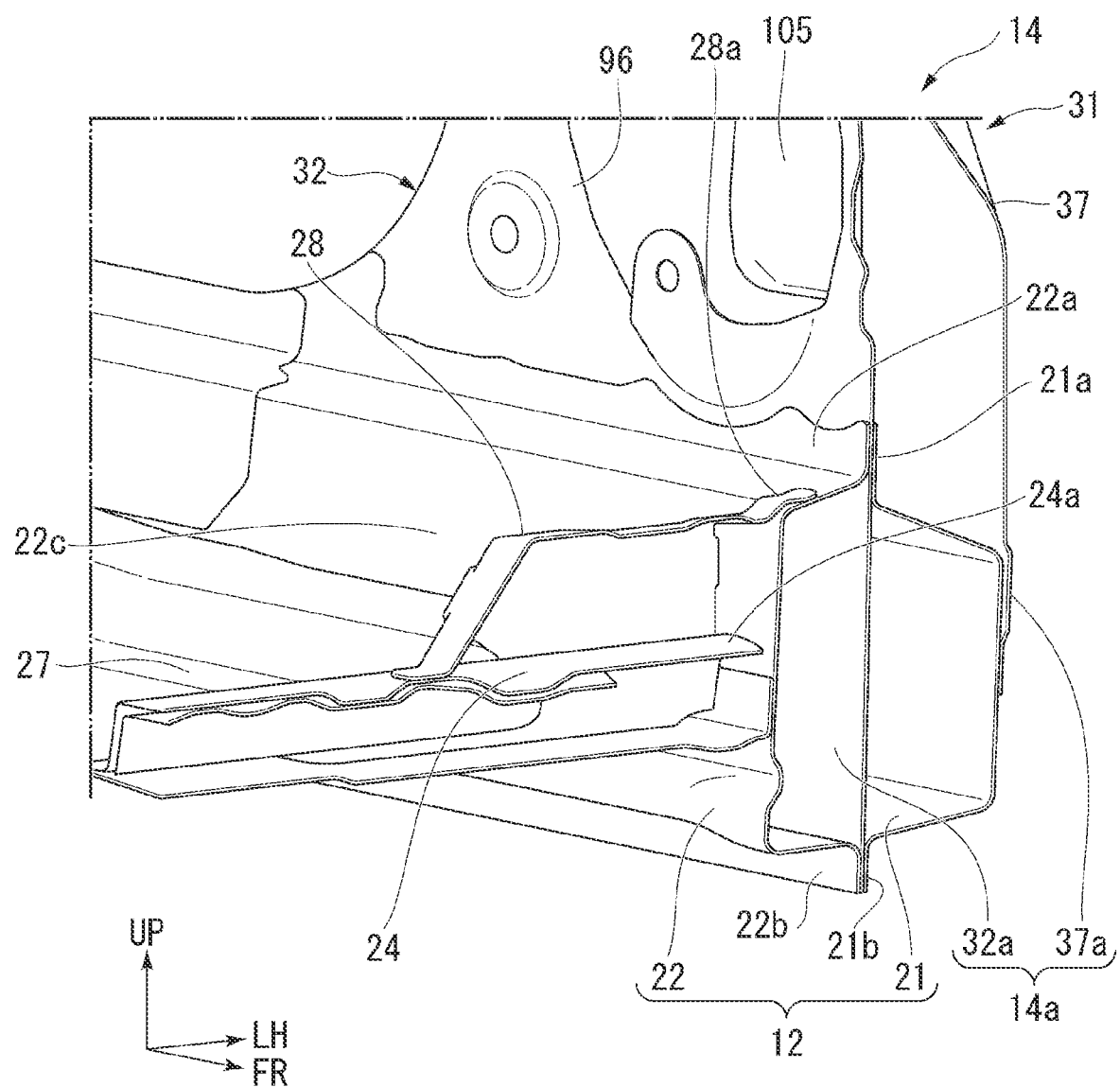
FIG. 3 is a perspective view of a state in which a side sill of the embodiment is broken when seen from the passenger compartment side.

As shown in FIGS. 2 and 3, the side sill 12 includes a side sill outer panel 21 and a side sill inner panel 22.

The side sill outer panel 21 is formed to have a hat-shaped cross section having an upper flange 21a and a lower flange 21b. The side sill inner panel 22 is formed to have a hat-shaped cross section having an upper flange 22a and a lower flange 22b.

The upper flanges 21a and 22a of the side sill outer panel 21 and the side sill inner panel 22 are joined to each other. Further, the lower flanges 21b and 22b of the side sill outer panel 21 and the side sill inner panel 22 are joined to each other. Thus, the side sill 12 is formed to have a closed cross section with the side sill outer panel 21 and the side sill inner panel 22. In other words, the side sill 12 has a continuous hollow structure formed in the forward-rearward direction of the vehicle body. The side sill 12 is a frame member having high strength and rigidity against a load on the front and rear sides of the vehicle body.

An end portion 24a of a floor cross member 24 is joined to an inner surface (an inner surface of the side sill) 22c of the side sill inner panel 22. The inner surface 22c of the side sill inner panel 22 is a surface that faces inward in a vehicle width direction. The floor cross member 24 is, for example, a member having a hat-shaped cross section that extends in the vehicle width direction along a surface of the floor panel 27. Since the floor cross member 24 is joined to the surface of the floor panel 27, a closed cross section having high strength and rigidity is formed by the floor cross member 24 and the floor panel 27.

A mounting bracket 28 is mounted on a left end portion of the floor cross member 24. A left end portion 28a of the mounting bracket 28 is joined to the side sill inner panel 22. A leg section of a front seat is mounted in the mounting bracket 28.

Thus, for example, when a load is input to the center pillar 14 from the outside in the vehicle width direction due to a lateral collision or the like, the center pillar 14 can be firmly supported by the side sill 12 against the load input to the center pillar 14.

<Roof Side Rail>

As shown in FIGS. 1 and 2, the roof side rail 16 includes a roof side outer panel 25 and a roof side inner panel 26.

The roof side outer panel 25 has an upper flange 25*a* and a lower flange 25*b*. The roof side inner panel 26 has an upper flange 26*a* and a lower flange 26*b*. The upper flanges 25*a* and 26*a* of the roof side outer panel 25 and the roof side inner panel 26 are joined to each other. Further, the lower flanges 25*b* and 26*b* of the roof side outer panel 25 and the roof side inner panel 26 are joined to each other.

Thus, the roof side rail 16 is formed to have a closed cross section by the roof side outer panel 25 and the roof side inner panel 26. The roof side rail 16 is a highly rigid member that forms a vehicle body frame on the lateral side of the upper portion of the vehicle body.

<Center Pillar>

Figure 4:
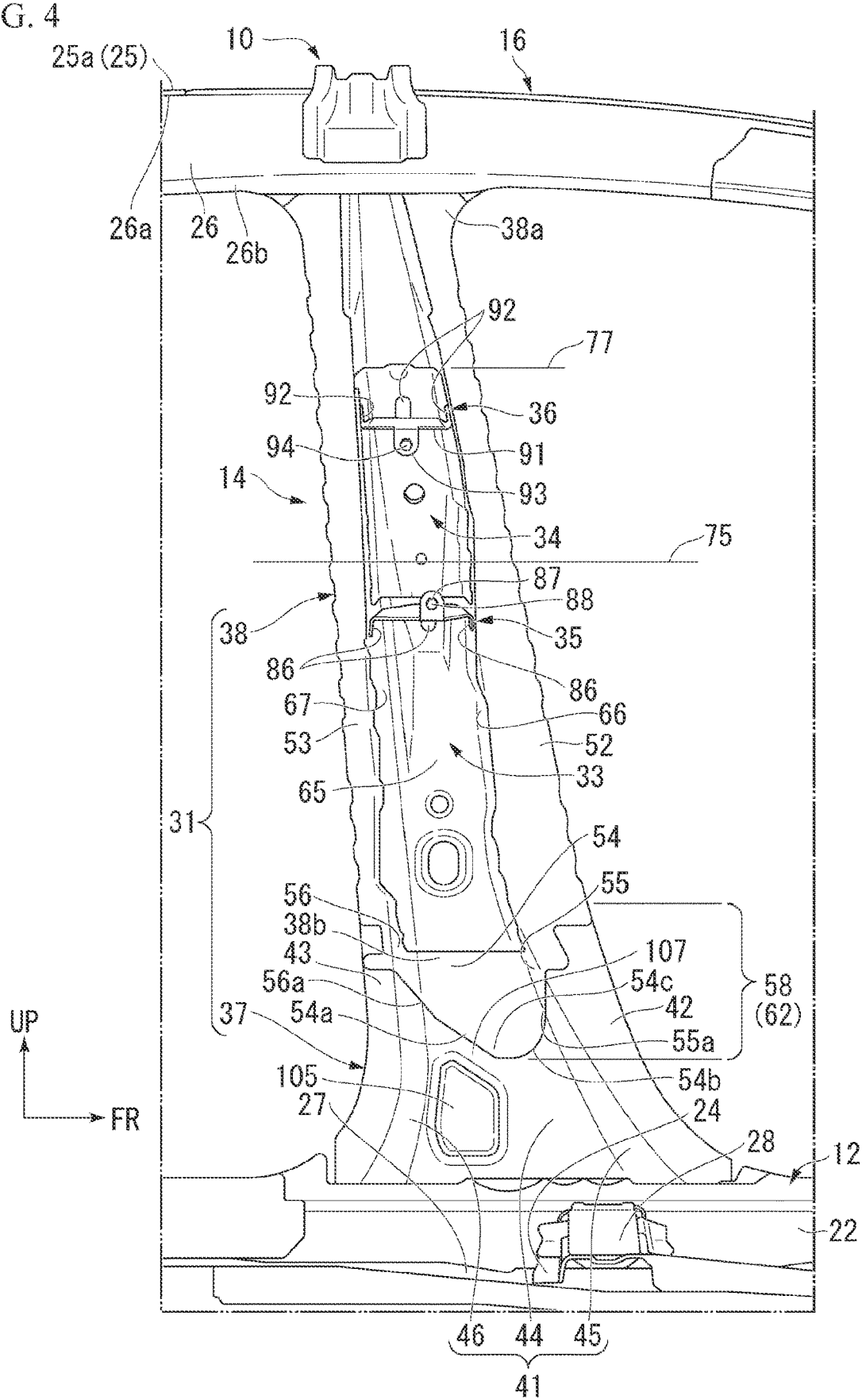
FIG. 4 is a perspective view of the state in which the side sill of the embodiment is broken when seen from the outside of a vehicle.
Figure 5:
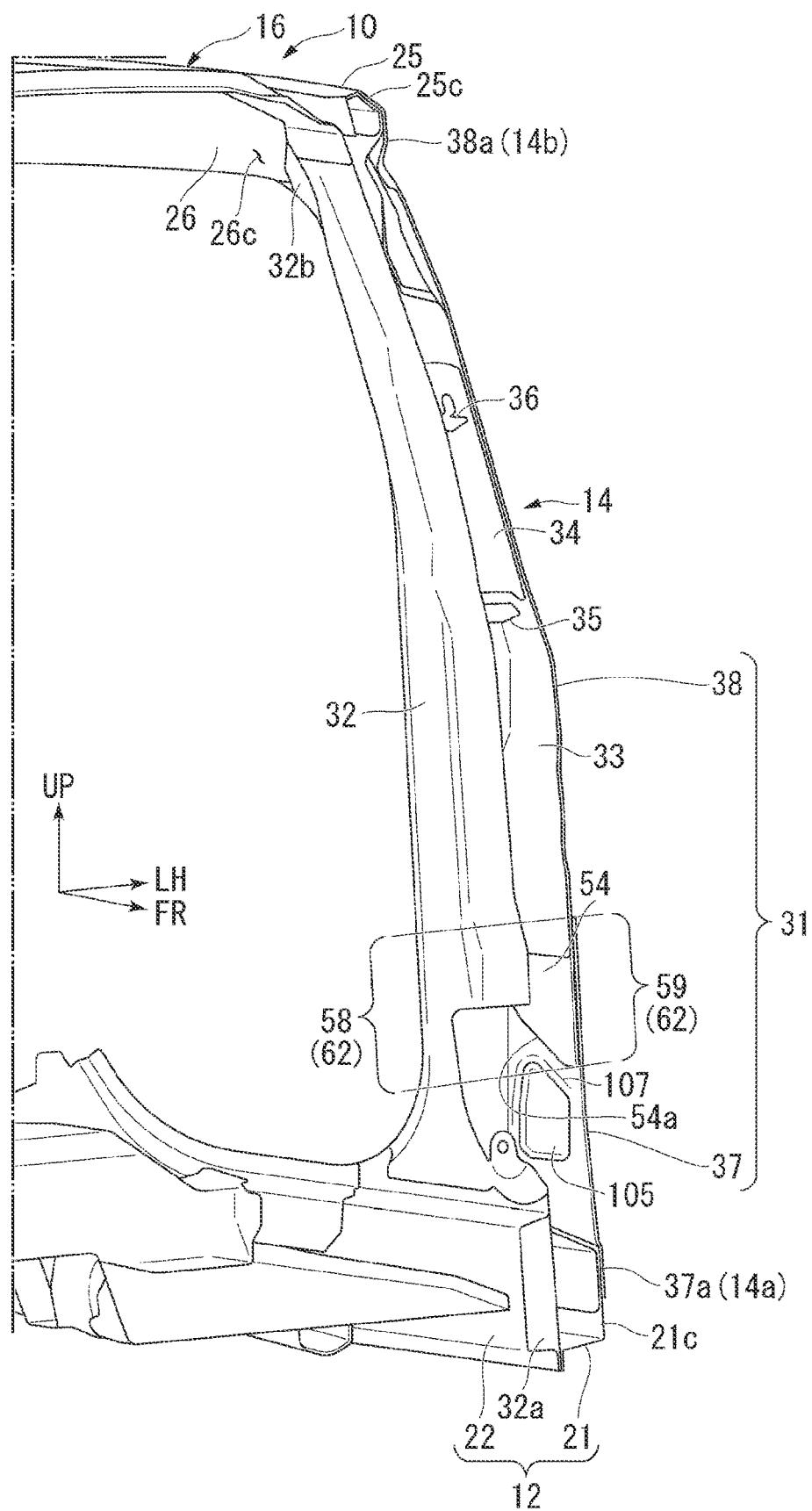
FIG. 5 is a side view in which an inner panel is removed from the center pillar of the embodiment.

As shown in FIGS. 4 and 5, the center pillar 14 includes an outer panel 31, an inner panel 32, a first reinforcing member 33, a second reinforcing member 34, a first bulkhead (a bulkhead) 35, and a second bulkhead (a bulkhead) 36. The center pillar 14 has a closed cross section formed by joining the outer panel 31 and the inner panel 32, and the formed closed cross section extends in a vertical direction.

The outer panel 31 includes a lower section 37 and an upper section 38. The lower section 37 is a member that forms a lower region of the outer panel 31. The upper section 38 is an upper region that overlaps the lower section 37 and extends upward from a middle of the lower section 37. The upper section 38 is formed of a higher strength material than that of the lower section 37.

As shown in FIGS. 1 and 4, the lower section 37 includes a lower bulging section 41 that bulges outward in the vehicle width direction, a lower front brim section (one of a pair of brim sections in the claims) 42 that protrudes from the lower bulging section 41 to the front of the vehicle body, and a lower rear brim section (the other of the pair of brim sections in the claims) 43 that protrudes from the lower bulging section 41 to the rear of the vehicle body.

The lower bulging section 41 includes a lower top section (a top section in claims) 44 disposed in the forward-rearward direction of the vehicle body, a lower front leg section (one of a pair of leg sections in the claims) 45 that extends inward in the vehicle width direction from a front side (one of both end portions) of the lower top section 44, and a lower rear leg (the other of the pair of leg sections in the claims) 46 that extends inward in the vehicle width direction from a rear side (the other of both end portions) of the lower top section 44.

Due to the lower top section 44, the lower front leg section 45, and the lower rear leg section 46, the lower bulging section 41 is formed to have a substantially U-shaped cross section (including a U-shaped cross section) that opens inward in the vehicle width direction.

The lower front brim section 42 protrudes from a front opening side of the lower bulging section 41 (that is, the lower front leg section 45) toward the front of the vehicle body. The lower rear brim section 43 protrudes from a rear opening side of the lower bulging section 41 (that is, the lower rear leg section 46) toward the rear of the vehicle body.

Due to the lower bulging section 41, the lower front brim section 42, and the lower rear brim section 43, the lower section 37 is formed to have a hat-shaped cross section that opens inward in the vehicle width direction.

Figure 6:
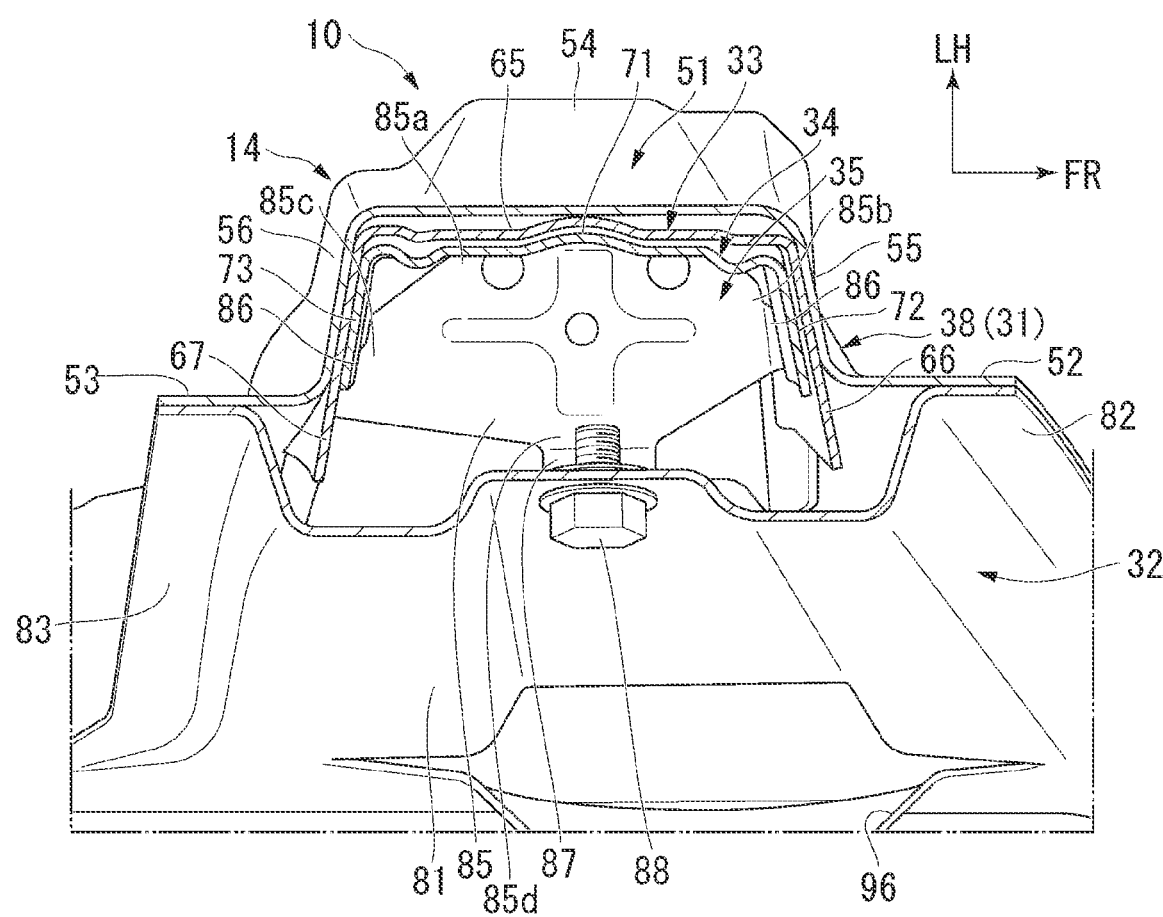
FIG. 6 is a perspective view of the lateral section structure of the vehicle body of the embodiment broken by the center pillar when seen from the passenger compartment side.

As shown in FIG. 6, the upper section 38 includes an upper bulging section 51 that bulges outward in the vehicle width direction, an upper front brim section (one of a pair of brim sections in the claims) 52 that protrudes from the upper bulging section 51 to the front of the vehicle body, and an upper rear brim section (the other of the pair of brim sections in the claims) 53 that protrudes from the lower bulging section 41 to the rear of the vehicle body.

The upper bulging section 51 includes an upper top (top of claim 54 disposed in the forward-rearward direction of the vehicle body, an upper front leg section (one of the pair of leg sections in the claims) 55 that extends inward in the vehicle width direction from a front side (one of both end portions) of the upper top section 54, and an upper rear leg section (the other of the pair of leg sections in the claims) 56 that extends inward in the vehicle width direction from a rear side (the other of both end portions) of the upper top section 54.

Due to the upper top section 54, the upper front leg section 55, and the upper rear leg section 56, the upper bulging section 51 is formed to have a substantially U-shaped cross section (including a U-shaped cross section) that opens inward in the vehicle width direction.

The upper front brim section 52 protrudes from the front opening side of the upper bulging section 51 (that is, the upper front leg section 55) toward the front of the vehicle body. The upper rear brim section 53 protrudes from the rear opening side of the upper bulging section 51 (that is, the upper rear leg section 56) toward the rear of the vehicle body.

Due to the upper bulging section 51, the upper front brim section 52, and the upper rear brim section 53, the upper section 38 is formed to have a hat-shaped cross section that opens inward in the vehicle width direction.

As shown in FIG. 4, the upper section 38 has an upper overlapping section 58 at a lower portion thereof. In the upper overlapping section 58, a lower end of the upper top section 54 is formed by an inclined side 54*a* and a curved side 54*b*. The inclined side 54*a* is inclined downward from a lower end 56*a* of the upper rear leg section 56 toward the front of the vehicle body. The curved side 54*b* is formed to be curved downward to bulge from a front end 54*c* of the inclined side 54*a* to a lower end 55*a* of the upper front leg section 55.

As shown in FIGS. 2 and 5, a lower overlapping section 59 of the lower section 37 overlaps and is joined to the upper overlapping section 58 from the outside in the vehicle width direction. Thus, the outer panel 31 is formed by the lower section 37 and the upper section 38. Due to the lower overlapping section 59 and the upper overlapping section 58 being joined in an overlapping state, an overlapping section 62 is formed by the lower overlapping section 59 and the upper overlapping section 58.

A lower end of the overlapping section 62 forms the inclined side 54*a*. That is, a lower end of the upper section 38 (specifically, the inclined side 54*a* of the upper top section 54) is inclined downward in the forward-rearward direction of the vehicle body along the lower end of the overlapping section 62 in which the lower section 37 and the upper section 38 overlap and are joined to each other, and is disposed at a position at which it faces an opening section 96 that will be described later.

As another example, the upper overlapping section 58 may be joined to the lower overlapping section 59 from the outside in the vehicle width direction. In this case, a lateral impact load can be concentrated on a fragile section 107 (refer to FIG. 7) that will be described later.

In the outer panel 31, a lower end portion 37a of the lower section 37 is joined to an outer surface 21c of the side sill outer panel 21 (an outer surface of the side sill). In the outer panel 31, the upper end portion 38a of the upper section 38 is joined to an outer surface 25c of the roof side outer panel 25 (an outer surface of the roof side rail).

(Reinforcing Member)

As shown in FIGS. 4 and 6, the first reinforcing member 33 is joined to an inner surface of the upper section 38 in an overlapping state. The first reinforcing member 33 extends upward from a portion 38b near the lower end of the upper section 38 to the upper end portion 38a of the upper section 38. Specifically, the first reinforcing member 33 has a first top section 65, a first front leg section 66, and a first rear leg section 67. The first reinforcing member 33 is formed to have a substantially U-shaped cross section (including a U-shaped cross section) along the inner surface of the upper section 38 by the first top section 65, the first front leg section 66, and the first rear leg section 67.

The second reinforcing member 34 is joined to the inner surface of the first reinforcing member 33 in an overlapping state. The second reinforcing member 34 has a second top section 71, a second front leg section 72, and a second rear leg section 73. The second reinforcing member 34 is formed to have a substantially U-shaped cross section (including a U-shaped cross section) along the inner surface of the first reinforcing member 33 by the second top section 71, the second front leg section 72, and the second rear leg section 73.

The second reinforcing member 34 extends to, for example, a portion curved inward from a belt line section (a belt line) 75 to a belt line upper position 77.

The belt line section 75 refers to a line that extends in a transverse direction along a lower end portion of a side window glass of the vehicle body. The belt line upper position 77 is an intermediate position between the belt line section 75 and the roof side rail 16.

The second reinforcing member 34 is formed to have a smaller height dimension in the vertical direction than the first reinforcing member 33. The upper section 38, the first reinforcing member 33, and the second reinforcing member 34 overlap each other, for example, at a portion above the belt line section 75. In other words, in the center pillar 14, the upper section 38, the first reinforcing member 33, and the second reinforcing member 34 overlap each other at a portion above the belt line section 75.

As shown in FIGS. 4 and 6, the inner panel 32 includes an inner bulging section 81 that bulges inward in the vehicle width direction, an inner front brim section 82 that protrudes from the inner bulging section 81 to the front of the vehicle body, and an inner rear brim section 83 that protrudes from the inner bulging section 81 to the rear of the vehicle body.

The inner front brim section 82 is joined to the lower front brim section 42 and the upper front brim section 52 of the outer panel 31. The inner rear brim section 83 is joined to the lower rear brim section 43 and the upper rear brim section 53.

Thus, the inner panel 32 is joined to the outer panel 31, and the center pillar 14 is formed to have a closed cross section by the inner panel 32 and the outer panel 31. The center pillar 14 is a highly rigid member that extends in the vertical direction between the side sill 12 and the roof side rail 16 and forms a vehicle body frame.

As shown in FIGS. 2 and 3, a lower end portion 32a of the inner panel 32 passes through the side sill 12 in the vertical direction and is joined thereto. The lower end portion 32a of the inner panel 32 is joined in a state in which the lower end portion 32a is sandwiched between the upper flange 21a of the side sill outer panel 21 and the upper flange 22a of the side sill inner panel 22. Further, the lower end portion 32a of the inner panel 32 is joined in a state in which the lower end portion 32a is sandwiched between the lower flange 21b of the side sill outer panel 21 and the lower flange 22b of the side sill inner panel 22.

In the outer panel 31, a lower end portion 37a of the lower section 37 is joined to the outer surface 21c of the side sill outer panel 21. Thus, a lower end portion 14a of the center pillar 14 is firmly joined to the side sill 12.

As shown in FIG. 5, an upper end portion 32b of the inner panel 32 is joined to an inner surface (an inner surface of the roof side rail, a surface on the passenger compartment side) 26c of the roof side inner panel 26. In the outer panel 31, the upper end portion 38a of the upper section 38 is joined to the outer surface 25c of the roof side outer panel 25. That is, an upper end portion 14b of the center pillar 14 is firmly joined to the roof side rail 16.

(Bulkhead)

As shown in FIGS. 4 and 6, the first bulkhead 35 is provided inside the first reinforcing member 33 of the center pillar 14. The first bulkhead 35 has a partition wall 85, a first folding flange 86, and a second folding flange 87.

The partition wall 85 is disposed to intersect (specifically, orthogonally) with respect to a longitudinal direction of the first reinforcing member 33. The partition wall 85 has a second outer side 85a, a second front side 85b, a second rear side 85c, and a second inner side 85d. An outer contour of the partition wall 85 is formed along the substantially U-shaped cross section of the first reinforcing member 33 by the second outer side 85a, the second front side 85b, and the second rear side 85c.

Further, the second inner side 85d is disposed on the opening side of the first reinforcing member 33 (the inner bulging section 81 side).

The first folding flange 86 is provided on each of the second outer side 85a, the second front side 85b, and the second rear side 85c. The first folding flange 86 is bent downward along the first top section 65 of the first reinforcing member 33 from a central section of the second outer side 85a in the forward-rearward direction of the vehicle body, and is joined to the first top section 65.

The first folding flange 86 is bent downward along the first front leg section 66 of the first reinforcing member 33 from the second front side 85b and is joined to the first front leg section 66. The first folding flange 86 is bent downward along the first rear leg section 67 of the first reinforcing member 33 from the second rear side 85c and is joined to the first rear leg section 67.

That is, the partition wall 85 is joined to the inside of the substantially U-shaped cross section of the first reinforcing member 33 by the first folding flange 86.

The second folding flange 87 is provided on the second inner side 85d. Specifically, the second folding flange 87 is bent upward along the inner bulging section 81 of the inner panel 32 from a central section of the second inner side 85d in the forward-rearward direction of the vehicle body and is coupled to the inner bulging section 81 by a fastening member (for example, a bolt 88 and a nut).

In this way, the first folding flange 86 is joined to wall sections of the first reinforcing member 33 having a substantially U-shaped cross section formed by the first top section 65, the first front leg section 66, and the first rear leg section 67. Further, the second folding flange 87 is coupled to the inner bulging section 81. Thus, all four wall sections of a rectangular cross section formed by the first reinforcing member 33 and the inner panel 32 can be constrained by the first bulkhead 35. Therefore, the strength and rigidity of the center pillar 14 can be increased.

Further, the second bulkhead 36 is provided inside the second reinforcing member 34 of the center pillar 14. The second bulkhead 36 is formed substantially symmetrically with the first bulkhead 35 in the vertical direction.

That is, a partition wall 91 of the second bulkhead 36 is joined to the inside of the substantially U-shaped cross section of the second reinforcing member 34 by the first folding flange 92.

Further, a second folding flange 93 of the partition wall 91 is coupled to the inner bulging section 81 of the inner panel 32 by a fastening member (for example, a bolt 94 and a nut). Therefore, the partition wall 91 is connected to the inner bulging section 81 by the second folding flange 93.

Thus, all four wall sections of the rectangular cross section formed by the second reinforcing member 34 and the inner panel 32 can be constrained by the second bulkhead 36. Therefore, the strength and rigidity of the center pillar 14 can be increased.

As described above, the first bulkhead 35 is provided in the first reinforcing member 33. The second bulkhead 36 is provided in the second reinforcing member 34. Therefore, the upper front leg section 55 and the upper rear leg section 56 of the upper section 38 are reinforced by the first bulkhead 35 and the second bulkhead 36.

Thus, for example, when a load due to a lateral collision or the like is input to the center pillar 14 from the outside in the vehicle width direction, bending of the upper front leg section 55 and the upper rear leg section 56 in the forward-rearward direction of the vehicle body due to the input load can be suppressed. In other words, crushing and deforming of the upper section 38 toward the inside in the vehicle width direction due to the input load can be suppressed.

(Opening Section)

Figure 7:
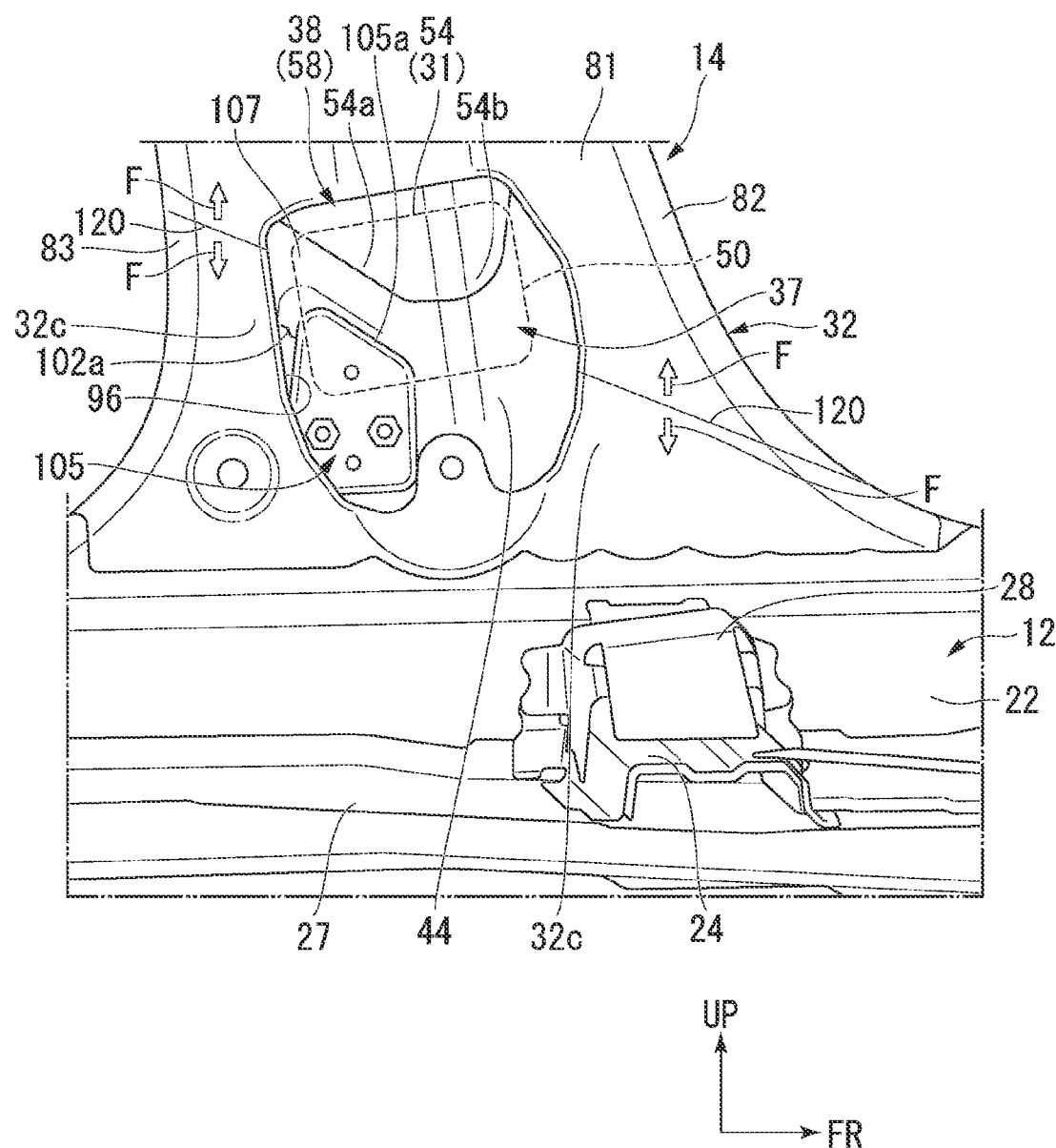
FIG. 7 is a perspective view showing a state in which the center pillar of the embodiment is broken.

As shown in FIG. 7, the opening section 96 is formed in the lower portion of the inner panel 32. The opening section 96 is disposed at a position at which the opening section 96 faces the inclined side 54a and the curved side 54b of the upper overlapping section 58, a fragile section 107 described later, and a reinforcing bracket 105 described later.

A retractor 50 (a seatbelt component) of a seatbelt device is inserted (disposed) into the opening section 96. The retractor 50 is a device that winds and unwinds a webbing of the seatbelt device.

(Fragile Section)

Figure 8:
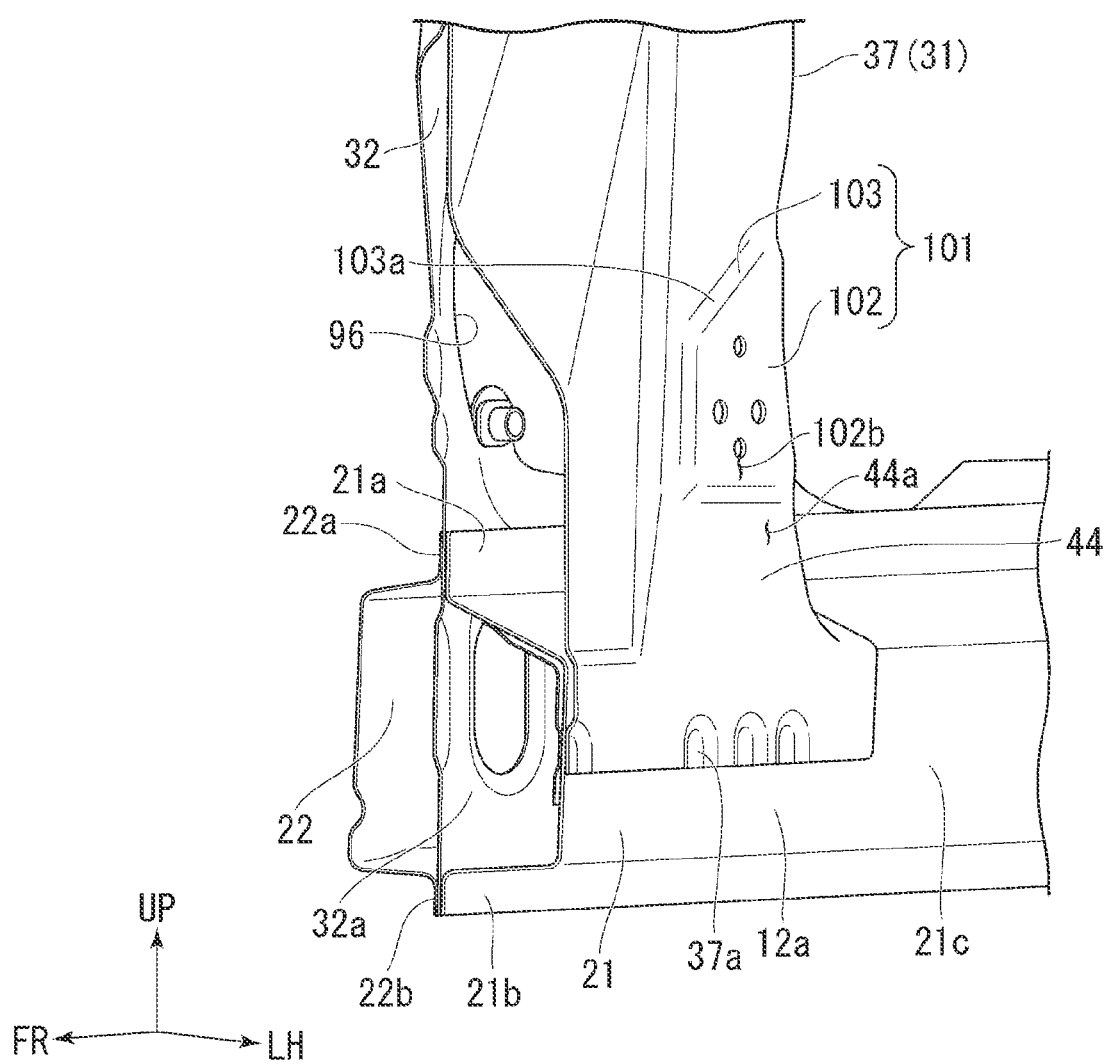
FIG. 8 is a side view showing the center pillar of the embodiment.

As shown in FIGS. 7 and 8, a lower end of the overlapping section 62 formed by joining the lower overlapping section 59 and the upper overlapping section 58 in the overlapping state forms the inclined side 54a. Therefore, the lower section 37 adjacent to the inclined side 54a forms the fragile section 107. In order to further define the fragile section 107, the following structure is adopted. A mounting pedestal 101 for fixing a lower door hinge is formed on the lower top section 44 of the lower section 37. The mounting pedestal 101 is disposed parallel to the lower side of the inclined side 54a of the upper overlapping section 58 and bulges outward in the vehicle width direction with respect to an outer surface 44a of the lower top section 44. The mounting pedestal 101 has a pedestal section 102 and a pedestal peripheral wall 103. The pedestal section 102 is disposed outside in the vehicle width direction with respect to the outer surface 44a of the lower top section 44 and is formed to have a quadrangular shape. Further, the pedestal section 102 is formed to be flat along the lower top section 44. The pedestal peripheral wall 103 is formed along a peripheral edge of the pedestal section 102. The pedestal peripheral wall 103 is bent outward in the vehicle width direction from the lower top section 44 to the pedestal section 102. In the pedestal peripheral wall 103, an upper peripheral wall (a bent section in claims 103a is formed in a downward slope from the rear of the vehicle body to the front of the vehicle body.

A reinforcing bracket (a reinforcing member) 105 is joined to a back surface 102a of the pedestal section 102 from the passenger compartment side. The reinforcing bracket 105 is formed to have a quadrangular shape substantially the same as the exterior of the pedestal section 102. In the reinforcing bracket 105, an upper bracket side 105a is disposed below the upper peripheral wall 103a at a predetermined interval. The upper bracket side 105a is formed in a downward slope along the upper peripheral wall 103a.

Since the reinforcing bracket 105 is joined to the back surface 102a of the pedestal section 102 in an overlapping state, the strength and rigidity of the pedestal section 102 are enhanced. For example, a door hinge of a rear side door 116 (refer to FIG. 1) is mounted on a surface 102b of the pedestal section 102 with fastening members such as bolts and nuts (not shown). The rear side door 116 is, for example, a side door that is disposed behind the vehicle body of the center pillar 14 to be openable and closable.

In the lower top section 44, the fragile section 107 is formed between the upper bracket side 105a of the reinforcing bracket 105 and the inclined side 54a of the upper top section 54. The fragile section 107 is defined by the upper bracket side 105a, the upper peripheral wall 103a, and the inclined side 54a (that is, the lower end of the overlapping section 62). In other words, the fragile section 107 is disposed along the lower end of the upper section (that is, the inclined side 54a).

Further, the fragile section 107 extends in a downward slope along the inclined side 54a (the lower end of the overlapping section 62) of the upper top section 54 toward the front of the vehicle body. Further, the fragile section 107 is disposed at a position in which the fragile section faces the opening section 96 of the inner panel 32 that will be described later.

Here, the overlapping section 62 is a portion in which the lower overlapping section 59 and the upper overlapping section 58 are joined in an overlapped state. Further, below the fragile section 107, the reinforcing bracket 105 is joined to the mounting pedestal 101. That is, the strength of the fragile section 107 is preferably suppressed to be lower than that of the reinforcing bracket 105 and the overlapping section 62.

Therefore, for example, when a load due to a lateral collision or the like is input to the center pillar 14 from the outside in the vehicle width direction, stress can be preferably concentrated on the fragile section 107. Thus, the fragile section 107 can be preferably deformed by the load input to the center pillar 14.

The fragile section 107 is disposed at a position at which the fragile section 107 faces the opening section 96. Therefore, in the inner panel 32, a tensile load F acts in the vertical direction along a virtual line 120 at a peripheral edge 32c of the opening section 96 that faces the fragile section 107. The virtual line 120 is a line that is substantially the same height as the fragile section 107 and is similarly inclined toward the front of the vehicle body.

Thus, the peripheral edge 32c of the opening section 96 can be deformed along the inclined virtual line 120. When the peripheral edge 32c is deformed along the virtual line 120, impact energy can be absorbed, and then the peripheral edge 32c of the opening section 96 can be cracked and broken along the virtual line 120.

In this way, the reinforcing bracket 105 is provided downward from the lower end (the inclined side 54a) of the upper section 38 at a predetermined interval, and the fragile section 107 is formed by the upper bracket side 105a or the like of the reinforcing bracket 105. Thus, the fragile section 107 can be easily formed on the lower section 37 (the outer panel 31).

The fragile section 107 is formed using the upper peripheral wall 103a of the mounting pedestal 101 on which the door hinge is mounted. Thus, the fragile section 107 can be more easily formed on the lower top section 44.

Further, the upper peripheral wall 103a is a bent section of the mounting pedestal 101. The bent section extends in a downward slope toward the front of the vehicle body. Therefore, when the fragile section 107 is formed using the bent section (that is, the upper peripheral wall 103a), for example, the fragile section 107 can be preferably deformed in a downward slope toward the front of the vehicle body by the load input due to the lateral collision.

A door hinge provided on the rear side door 116 (refer to FIG. 1) is fixed to the mounting pedestal 101 and the reinforcing bracket 105. Thus, the door hinge can be firmly fixed to the center pillar 14.

As shown in FIG. 1, a rear end portion 112a of a front door beam 112 is disposed to face a front end portion 107a of the fragile section 107 on the outside in the vehicle width direction. The front door beam 112 is formed in a downward slope from a front side to a rear side of the front side door 113, for example, in order to reinforce the front side door 113. The front door beam 112 may be disposed horizontally.

Further, a front end portion 115a of a rear door beam 115 is disposed to face a rear end portion 107b of the fragile section 107 on the outside in the vehicle width direction. The rear door beam 115 is formed in an upward slope from a front side to a rear side of a rear side door 116, for example, in order to reinforce the rear side door 116. The rear door beam 115 may be disposed horizontally.

As described above, according to the lateral section structure of the vehicle body 10, when a load is input to the center pillar 14 due to, for example, a lateral collision, a compressive load (the stress) can be concentrated on the inclined fragile section 107 by the input load. The center pillar 14 can be bent and deformed along the inclined fragile section 107 toward the passenger compartment side by concentrating the compressive load (the stress) on the inclined fragile section 107.

Here, the inclined fragile section 107 is inclined toward the front of the vehicle body on the outer panel side. Further, the fragile section 107 is disposed at a position at which the fragile section 107 faces the opening section 96 of the inner panel. Therefore, a virtual line 120 is formed to be inclined at substantially the same height as the peripheral edge 32c of the opening section 96 facing the fragile section 107 and at front and rear positions. The tensile load F acts in the vertical direction along the inclined virtual line 120.

Thus, the peripheral edge 32c can be deformed along the inclined virtual line 120 to absorb impact energy, and then the peripheral edge 32c of the opening section 96 can be cracked and broken along the virtual line 120.

When a crack is inclinedly generated at the peripheral edge 32c of the opening section 96, a length of the crack (that is, a length of deformation) can be increased as compared with a case in which the crack extending horizontally in the forward-rearward direction of the vehicle body is generated on the peripheral edge 32c of the opening section 96. An amount of absorption of impact energy input due to a lateral collision or the like can be increased by increasing the length of the crack. An increase in a weight of the center pillar 14 can be suppressed and the amount of absorption of impact energy can be ensured by inclining the fragile section 107 toward the front of the vehicle body in this way.

Further, the fragile section 107 is provided on the lower top section 44 of the lower section 37. Here, when a load is input to the center pillar 14 from the outside in the vehicle width direction due to a lateral collision or the like, the load is input to the lower top section 44. Therefore, the load input to the lower top section 44 acts from the lower front leg section 45 and the lower rear leg section 46 toward the lower front brim section 42 and the lower rear brim section 43. The load acting on the lower front brim section 42 and the lower rear brim section 43 causes the tensile load F to act in the vertical direction with respect to the virtual line 120 corresponding to the fragile section 107.

The inner panel 32 is joined to the lower front brim section 42 and the lower rear brim section 43. The opening section 96 is formed in the inner panel 32. Thus, the crack that is similarly inclined can be efficiently generated along the similarly inclined virtual line 120 on the peripheral edge 32c of the opening section 96 by the tensile load F acting on the lower front brim section 42 and the lower rear brim section 43.

The lower end portion 14a of the center pillar 14 is firmly joined to the side sill 12. Thus, when a load is input to the center pillar 14 due to a lateral collision or the like, due to the input load, the tensile load F can be reliably applied in the vertical direction along the similarly inclined virtual line 120 corresponding to the inclined fragile section 107, and the amount of absorption of impact energy can be ensured.

Further, the side sill 12 is a frame member in which a hollow structure is continuously formed in the forward-rearward direction of the vehicle body, and in particular, the strength and rigidity are high with respect to the load in the front and rear of the vehicle body. Thus, for example, a load input due to a frontal collision or a rearward collision can be supported by the side sill 12, and an influence on the center pillar 14 can be suppressed.

In addition, an end portion 24a of the floor cross member 24 is joined to the inner surface 22c of the side sill inner panel 22. Therefore, when a load is input to the center pillar 14 from the outside in the vehicle width direction due to a lateral collision or the like, the center pillar 14 can be firmly supported by the side sill 12. Thus, due to the load input to the center pillar 14 caused by a lateral collision or the like, the tensile load F is more reliably applied in the vertical direction along the virtual line 120 corresponding to the fragile section 107, and the amount of absorption of impact energy can be ensured more preferably.

The upper end portion 14b of the center pillar 14 is firmly joined to the roof side rail 16. Thus, when a load is input to the center pillar 14 from the outside in the vehicle width direction due to a lateral collision or the like, due to the input load, the tensile load F can be reliably applied in the vertical direction along the virtual line 120 corresponding to the fragile section 107, and the amount of absorption of impact energy can be secured more preferably.

Further, a rear end portion 112a of the front door beam 112 is disposed to face a front end portion 107a of the fragile section 107 on the outside in the vehicle width direction. A front end portion 115a of the rear door beam 115 is disposed to face a rear end portion 107b of the fragile section 107 on the outside in the vehicle width direction.

Therefore, when a load is input from the outside in the vehicle width direction due to a lateral collision or the like, the input load can be transmitted from the front door beam 112 and the rear door beam 115 to the fragile section 107. That is, the fragile section 107 can be reliably deformed to be recessed inward in the vehicle width direction due to the input load. Thus, the tensile load F can be reliably applied in the vertical direction along the virtual line 120 corresponding to the fragile section 107, and the amount of absorption of impact energy can be preferably ensured.

The upper section 38, the first reinforcing member 33, and the second reinforcing member 34 overlap each other at a portion of the center pillar 14 above the belt line section 75. That is, the center pillar 14 has increased strength and rigidity at the portion above the belt line section 75. Therefore, the load input due to a lateral collision or the like is transmitted to the fragile section 107, and the fragile section 107 can be reliably deformed to be recessed inward in the vehicle width direction by the transmitted load. Thus, the tensile load F can be reliably applied in the vertical direction along the virtual line 120 corresponding to the fragile section 107, and the amount of absorption of impact energy can be preferably ensured.

Further, the first bulkhead 35 is provided in the first reinforcing member 33. The second bulkhead 36 is provided in the second reinforcing member 34. Therefore, when a load is input to the center pillar 14 from the outside in the vehicle width direction due to a lateral collision or the like, the crushing and deforming of the upper section 38 in the vehicle width direction due to the input load can be suppressed.

Thus, the load input due to a lateral collision or the like is transmitted to the fragile section 107, and due to the transmitted load, the fragile section 107 can be deformed to be surely recessed inward in the vehicle width direction. Therefore, the tensile load F can be reliably applied in the vertical direction along the virtual line 120 corresponding to the fragile section 107, and the amount of absorption of impact energy can be preferably ensured.

Although preferable embodiments of the present invention have been described above, the present invention is not limited to the embodiments. It is possible to add, omit, replace, and make other changes to the constitution without departing from the spirit of the present invention. The present invention is not limited by the above description, but only by the appended claims.

For example, in the above-described embodiment, an example in which the fragile section 107 is formed in a downward slope toward the front of the vehicle body has been described, but the present invention is not limited thereto. As another example, the fragile section 107 may be formed in an upward slope toward the front of the vehicle body.

Further, in the above embodiment, an example in which the strength of the fragile section 107 is preferably suppressed to a low level by forming the fragile section 107 between the overlapping section 62 and the reinforcing bracket 105 that have high strength has been described, but the present invention is not limited thereto. As another example, the fragile section may be formed to have a bead shape, to be thin, or the like.

Further, in the above-described embodiment, an example in which the first bulkhead 35 is provided in the first reinforcing member 33 and the second bulkhead 36 is provided in the second reinforcing member 34 has been described, but the present invention is not limited thereto. As another example, a bulkhead may be provided in one of the first reinforcing member 33 and the second reinforcing member 34. Alternatively, an arbitrary number of bulkheads may be provided in the first reinforcing member 33 and the second reinforcing member 34.

REFERENCE SIGNS LIST

10 Lateral section structure of vehicle body
12 Side sill
14 Center pillar
16 Roof side rail
21 Side sill outer panel
21c Outer surface of side sill outer panel (outer surface of side sill)
22 Side sill inner panel
22c Inner surface of side sill outer panel (inner surface of side sill)
24 Floor cross member
25 Roof side outer panel
25c Outer surface of roof side outer panel (outer surface of roof side rail)
26 Roof side inner panel
26c Inner surface of roof side inner panel (inner surface of roof side rail)
31 Outer panel
32 Inner panel
32b Upper end portion of inner panel
33 First reinforcing member
34 Second reinforcing member
35 First bulkhead (bulkhead)
36 Second bulkhead (bulkhead)
37 Lower section
38 Upper section
38a Upper end portion of the upper section
42 Lower front brim section (brim section)
43 Lower rear brim section (brim section)
44 Lower top section (top section)
45 Lower front leg section (leg section)
46 Lower rear leg section (leg section)
52 Upper front brim section (brim section)
53 Upper rear brim section (brim section)
54 Upper top section (top section)
54a Inclined side (lower end of overlapping section, lower end of upper section)
55 Upper front leg section (leg section)
56 Upper rear leg section (leg section)
62 Overlapping section
75 Belt line section (belt line)
96 Opening section
101 Mounting pedestal
103a Upper peripheral wall (bent section)
105 Reinforcing bracket (reinforcing member)
107 Fragile section
107a Front end portion of fragile section
107b Rear end portion of fragile section
112 Front door beam
112a Rear end portion of front door beam
115 Rear door beam
115a Front end portion of rear door beam

The invention claimed is:
1. A lateral section structure of a vehicle body with a center pillar which extends in a vertical direction and in which an outer panel and an inner panel are joined, wherein:
an opening section into which a seatbelt component is inserted is formed in the inner panel, the outer panel has a lower section configured to form a lower portion of the outer panel, and an upper section configured to overlap the lower section and to extend upward, and a lower end of the upper section is inclined upward or downward in a forward-rearward direction of a vehicle body along a lower end of an overlapping section in which the lower section and the upper section overlap and are joined to each other, and is disposed at a position at which the lower end of the upper section faces the opening section.

2. The lateral section structure of the vehicle body according to claim 1, wherein the outer panel has a top section disposed in the forward-rearward direction of the vehicle body, a pair of leg sections configured to extend inward from both ends of the top section in a vehicle width direction, and a pair of brim sections configured to protrude from the pair of leg sections in the forward-rearward direction of the vehicle body, the top section, the pair of leg sections and the pair of brim sections are formed to have a hat-shaped cross section that opens inward in the vehicle width direction, and a fragile section is disposed along a lower end of the upper section on the top section.

3. The lateral section structure of the vehicle body according to claim 1, wherein, in the outer panel, the lower section is joined to an outer surface of a side sill that extends in the forward-rearward direction of the vehicle body, and the inner panel passes through the side sill and is joined thereto.

4. The lateral section structure of the vehicle body according to claim 3, wherein, in the side sill, a floor cross member that extends in the vehicle width direction is joined to an inner surface inside the side sill in the vehicle width direction that faces an inside in the vehicle width direction.

5. The lateral section structure of the vehicle body according to claim 1, wherein, in the center pillar, an upper end portion of the upper section is joined to an outer surface of a roof side rail that extends in the forward-rearward direction of the vehicle body, and an upper end portion of the inner panel is joined to an inner surface of the roof side rail.

6. The lateral section structure of the vehicle body according to claim 2, wherein a rear end portion of a front door beam is disposed to face a front end portion of the fragile section on an outside in the vehicle width direction, and a front end portion of a rear door beam is disposed to face a rear end portion of the fragile section on an outside in the vehicle width direction.

7. The lateral section structure of the vehicle body according to claim 2, wherein the fragile section is formed by a reinforcing member of the lower section provided at a predetermined interval downward from a lower end of the upper section.

8. The lateral section structure of the vehicle body according to claim 2, wherein the fragile section is formed by a bent section of a mounting pedestal, on which a door hinge is mounted, in the lower section.

9. The lateral section structure of the vehicle body according to claim 1, wherein the center pillar includes a first reinforcing member that overlaps the upper section, and a second reinforcing member that is formed to be smaller than the first reinforcing member in the vertical direction and overlaps the first reinforcing member, and the upper section, the first reinforcing member, and the second reinforcing member overlap each other at a portion above a belt line.

10. The lateral section structure of the vehicle body according to claim 9, wherein the first reinforcing member is formed to have a U-shaped cross section along an inner surface of the outer panel, the second reinforcing member is formed to have a U-shaped cross section along an inner surface of the first reinforcing member, and the center pillar includes a bulkhead that is provided on at least one of the first reinforcing member and the second reinforcing member and suppresses crushing and deforming in the vehicle width direction.

* * * * *